(12) United States Patent
Xie et al.

(10) Patent No.: US 11,437,608 B2
(45) Date of Patent: Sep. 6, 2022

(54) DEVICE AND METHOD FOR SUPPLEMENTING ELECTRODE SHEET WITH LITHIUM

(71) Applicant: CONTEMPORARY AMPEREX TECHNOLOGY CO., LIMITED, Fujian (CN)

(72) Inventors: Bin Xie, Fujian (CN); Shitong Chen, Fujian (CN); Zhijie Gong, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/568,852

(22) Filed: Jan. 5, 2022

(65) Prior Publication Data

US 2022/0131127 A1    Apr. 28, 2022

Related U.S. Application Data

(63) Continuation of application No. PCT/CN2020/100293, filed on Jul. 4, 2020.

(30) Foreign Application Priority Data

Jul. 5, 2019 (CN) .......................... 201910605942.5

(51) Int. Cl.
*H01M 4/04* (2006.01)
*H01M 4/1395* (2010.01)
*H01M 4/02* (2006.01)

(52) U.S. Cl.
CPC ....... *H01M 4/0435* (2013.01); *H01M 4/1395* (2013.01); *H01M 2004/027* (2013.01)

(58) Field of Classification Search
CPC ............. H01M 4/0435; H01M 4/1395; H01M 2004/027; H01M 10/0525; H01M 4/134; H01M 4/382
See application file for complete search history.

(56) References Cited

FOREIGN PATENT DOCUMENTS

| CN | 207038626 U | 2/2018 |
|----|-------------|--------|
| CN | 207038628 U | 2/2018 |

(Continued)

OTHER PUBLICATIONS

English Translation of CN207038628 (Year: 2018).*

(Continued)

*Primary Examiner* — Andrew J. Oyer
(74) *Attorney, Agent, or Firm* — Scully Scott Murphy & Presser

(57) ABSTRACT

The present application provides a device and method for supplementing electrode sheet with lithium. The device for supplementing electrode sheet with lithium includes a rolling mechanism, an electrode sheet providing mechanism, a lithium film providing mechanism and a strip providing mechanism; the rolling mechanism includes two compression rollers; the electrode sheet providing mechanism is used for providing the electrode sheet; the lithium film providing mechanism is used for providing a lithium film, and the lithium film includes a transfer film and a lithium foil, and the lithium foil continuously adheres to the transfer film; the strip providing mechanism is used for providing a strip, and the strip includes a substrate and an adhesion layer, and the adhesion layer can correspond to the active substance layer of the electrode sheet; the rolling mechanism makes the lithium foil adhere to the active substance layer.

14 Claims, 3 Drawing Sheets

(56) References Cited

FOREIGN PATENT DOCUMENTS

CN         108899468 A     11/2018
CN         210040396 U     2/2020

OTHER PUBLICATIONS

International Search Report dated Sep. 23, 2020 issued in PCT/CN2020/100293.
Written Opinion dated Sep. 23, 2020 issued in PCT/CN2020/100293.

\* cited by examiner

DEVICE AND METHOD FOR SUPPLEMENTING ELECTRODE SHEET WITH LITHIUM

CROSS-REFERENCE TO RELATED APPLICATIONS

This application is a continuation of International Application No. PCT/CN2020/100293, filed on Jul. 4, 2020, which claims priority to Chinese Patent Application No. 201910605942.5, filed on Jul. 5, 2019. The disclosures of the aforementioned applications are hereby incorporated by reference in their entireties.

TECHNICAL FIELD

The embodiment of the present application relates to the field of electrochemistry, and particularly relates to a device and method for supplementing electrode sheet with lithium.

BACKGROUND

In recent years, along with the vigorous development of electric vehicles, requirements for the energy density of a power battery are increasingly stringent. For a negative electrode sheet, part of lithium is consumed due to the formation of a solid electrolyte interphase (SEI) in the first charge process of the battery, and then the loss of the lithium from a positive electrode material, is caused, thereby resulting in reduction of capacity of the battery, and reduction of the first efficiency. This is particularly pronounced in the negative electrode sheet using alloy materials (for example, silicon alloys, tin alloys, etc.) as active substances. Some solutions have been used in order to reduce the decrease in battery capacity due to irreversible capacity of the battery during the first charge-discharge process.

In one of the solutions, a device for supplementing electrode sheet with lithium is adopted. In the device for supplementing electrode sheet with lithium, a lithium film providing mechanism is used to provide a lithium film. The lithium film comprises a transfer film and a lithium foil. The lithium foil continuously adheres to the transfer film and faces an active substance layer of the electrode sheet. The electrode sheet comprises a current collector and the active substance layer discontinuously arranged on the surface of the current collector. A rolling mechanism is used for rolling the lithium film and the electrode sheet, and lithium foil in the lithium film discontinuously adheres to the active substance layer. However, in the device for supplementing the electrode sheet with the lithium, the lithium film is very thin, and the gap between compression rollers of the rolling mechanism is also relatively small when the electrode sheet is rolled, easily causing stress and deformation in the electrode sheet during the process of rolling lithium film.

SUMMARY

In view of problems existing in the prior art, the objective of the application is to provide a device and method for supplementing electrode sheet with lithium, which can reduce the pressure of covering a lithium film in the lithium supplement process of the electrode sheet, thereby reducing the damage to the lithium supplemented electrode sheet and the transfer film of the lithium film after lithium supplement.

For achieving the objective mentioned above, a technical solution used in the embodiment of the application is: on one hand, the application provides a device for supplementing electrode sheet with lithium; the electrode sheet comprises a current collector and an active substance layer discontinuously arranged on the surface of the current collector; the device for supplementing electrode sheet with lithium includes a rolling mechanism, an electrode sheet providing mechanism and a lithium film providing mechanism; the rolling mechanism comprises two compression rollers; the electrode sheet providing mechanism is located upstream from the two compression rollers, and the electrode sheet providing mechanism is used for providing electrode sheet between the two compression rollers; the lithium film providing mechanism is located upstream from the two compression rollers, and the lithium film providing mechanism is used for providing the lithium film, and the lithium film comprise a transfer film and a lithium foil; the device for supplementing electrode sheet with lithium further comprises a strip providing mechanism; the strip providing mechanism is used for providing strips between the transfer film of the lithium film and the compression roller on the side corresponding to the same; the strip comprises a substrate and an adhesion layer discontinuously arranged on the substrate, wherein the adhesion layer can correspond to the active substance layer of the electrode sheet; and the rolling mechanism is used for rolling the strip, the lithium film and the electrode sheet, such that the lithium foil in the lithium film adheres to the active substance layer.

In one embodiment, the device for supplementing electrode sheet with lithium further includes a transfer film collection mechanism, the transfer film collection mechanism being located downstream from the two compression rollers, and the transfer film collection mechanism being used for collecting the transfer film passing through the two compression rollers.

In one embodiment, the lithium film providing mechanism includes a pressing mechanism, the pressing mechanism being used for making the lithium foil adhere to the transfer film.

In one embodiment, the lithium film providing mechanism further includes an auxiliary film providing mechanism. The auxiliary film providing mechanism is located upstream from the pressing mechanism, and the auxiliary film providing mechanism is used for providing an auxiliary film for the pressing mechanism.

In one embodiment, the lithium film providing mechanism further includes an auxiliary film collection mechanism. The auxiliary film collection mechanism is located downstream from the pressing mechanism, and the auxiliary film collection mechanism is used for collecting the auxiliary film passing through the pressing mechanism.

In one embodiment, the pressing mechanism comprises a transfer film providing mechanism, a lithium ribbon providing mechanism and two rollers. The transfer film providing mechanism is used for providing a transfer film between the two rollers; the lithium ribbon providing mechanism is used for providing a lithium ribbon between the two rollers, and the two rollers is used for pressing the lithium ribbon and the transfer film, thereby pressing the lithium ribbon into the lithium foil, and making the lithium foil adhere to the transfer film, so as to form the lithium film.

In one embodiment, the strip providing mechanism comprises a strip release mechanism and a strip collection mechanism that are arranged upstream and downstream of the two compression rollers respectively. The strip release mechanism is used for releasing the strip to the two compression rollers, and the strip collection mechanism is used for collecting the strip passing through the two compression rollers.

In one embodiment, the substrate and/or the adhesion layer have/has elasticity.

In one embodiment, the device for supplementing electrode sheet with lithium further comprises a lithium supplemented electrode sheet collection mechanism. The lithium supplemented electrode sheet collection mechanism is located downstream from the two compression rollers, and the lithium supplemented electrode sheet collection mechanism is used for collecting the electrode sheet adhered to the active substance layer.

In one embodiment, the lithium film providing mechanism, the transfer film collection mechanism and the strip providing mechanism are correspondingly arranged into one or two sets on the basis that the active substance layer is arranged on one or two surfaces of the current collector.

The application has the following beneficial effects: compared with background art, due to the arrangement of the strip providing mechanism, the scrip provided by the strip providing mechanism can minimize the pressure of covering the lithium films during the process of supplementing electrode sheet with lithium, thereby reducing the damage to the lithium supplemented electrode sheet and the transfer film of the lithium film after lithium supplement.

For achieving the objective mentioned above, on the other hand, the application provides a method for supplementing electrode sheet with lithium. The electrode sheet comprises a current collector and an active substance layer discontinuously arranged on the surface of the current collector. The method for supplementing electrode sheet with lithium includes: providing the electrode sheet, a lithium film and a strip in a way that the lithium film is located between the strip and the electrode sheet, wherein the lithium film comprises a transfer film and a lithium foil, wherein the strip comprises a substrate and an adhesion layer discontinuously arranged on the substrate, and the adhesion layer can correspond to the active substance layer of the electrode sheet; and rolling the strip, the lithium film and the electrode sheet, such that the lithium foil in the lithium film adheres to the active substance layer.

In some embodiments, prior to providing the lithium film, the method for supplementing the electrode sheet with the lithium further includes making the lithium foil adhere to the transfer film.

In some embodiments, making the lithium foil adhere to the transfer film includes: providing a lithium ribbon, the transfer film and an auxiliary film; pressing the lithium ribbon, the transfer film and the auxiliary film to press the lithium ribbon into the lithium foil and make the lithium foil continuously adhere to the transfer film, so as to form the lithium film.

In some embodiments, the lithium film, the transfer film and the strip are correspondingly arranged into one or two sets on the basis that the active substance layer is arranged on one or two surfaces of the current collector.

The application has the following beneficial effects: compared with background art, by providing the strip, the strip providing mechanism may reduce the pressure of covering the lithium film in the lithium supplement process of the electrode sheet, thereby reducing the damage to the lithium supplemented electrode sheet and the transfer film of lithium film after lithium supplement.

| | |
|---|---|
| 1. rolling mechanism | A. auxiliary film |
| 11. compression roller | 33. auxiliary film collection mechanism |
| G. gap | |
| 2. electrode sheet providing mechanism | C. lithium film |
| | L0. lithium ribbon |
| P0. electrode sheet | L1. lithium foil |
| P01. current collector | 4. strip providing mechanism |
| P02. active substance layer | 41. strip release mechanism |
| R. blank current collector region | 42. strip collection mechanism |
| | S. strip |
| 3. lithium film providing mechanism | S1. substrate |
| 31. pressing mechanism | S2. adhesion layer |
| 311. transfer film providing mechanism | 5. transfer film collection mechanism |
| | P1. lithium supplemented electrode sheet |
| T. transfer film | |
| 312. lithium ribbon providing mechanism | 6. lithium supplemented electrode sheet collection mechanism |
| 313. roller | |
| 32. auxiliary film providing mechanism | |

DETAILED DESCRIPTION

The accompanying drawings illustrate embodiments of the application and it is to be understood that the disclosed embodiments are merely examples of the present application and that the application may be implemented in various forms. Therefore, specific details disclosed herein are not to be interpreted as limiting, but merely regarded as a basis for the claims and as an illustrative basis for teaching those of ordinary skill in the art to implement the application in various ways.

Furthermore, expressions of "above", "below", "left", "right", "front", "rear", etc. for illustrating indication directions of operation and structure of members in the embodiments are not absolute but relative. Although these indications are appropriate when the members are in positions shown in figures, these directions should be interpreted differently when their positions change, so as to correspond to the change.

Figure 1:
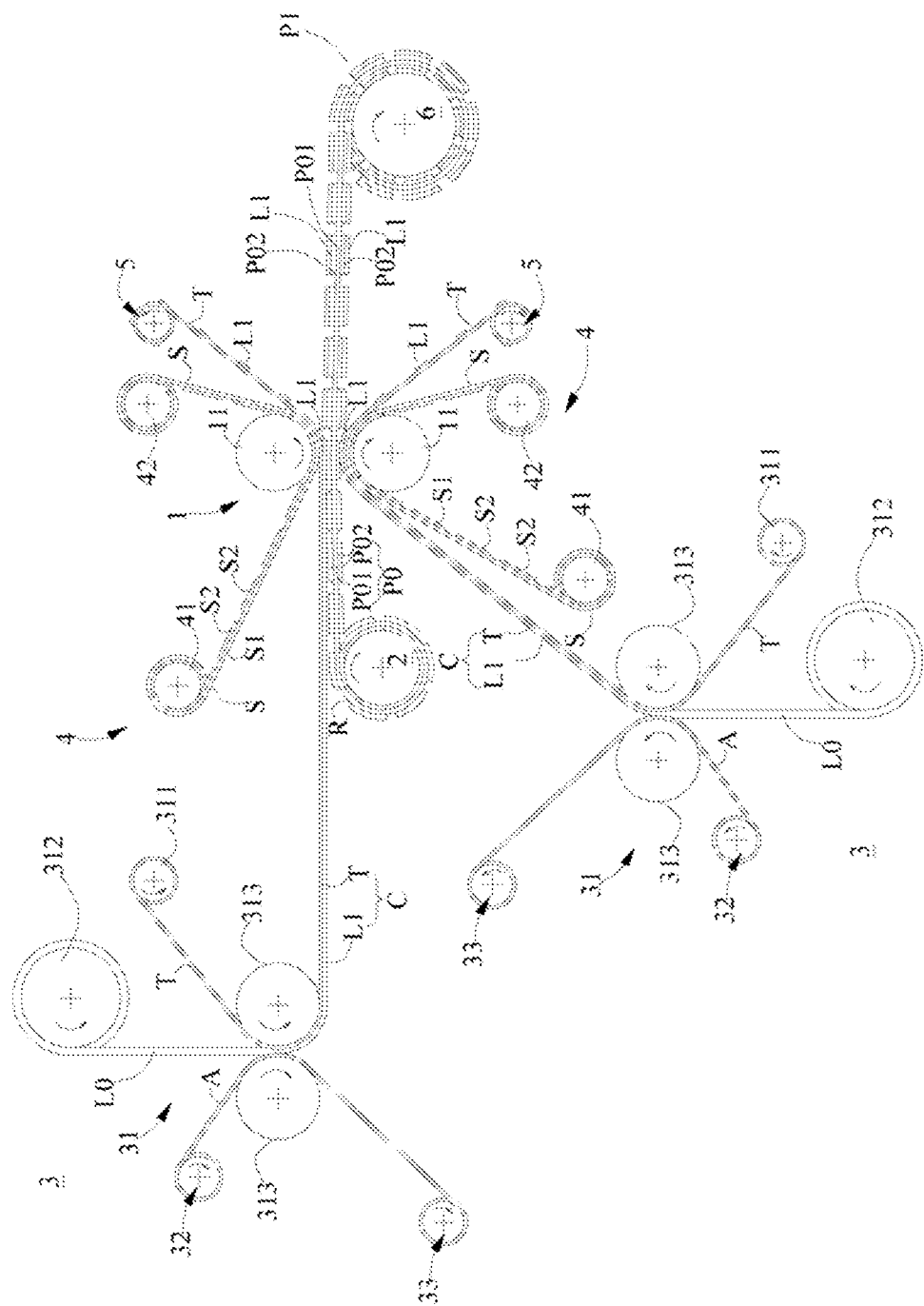
FIG. 1 is a schematic diagram of a first embodiment of a device for supplementing electrode sheet with lithium according to the application.
Figure 2:
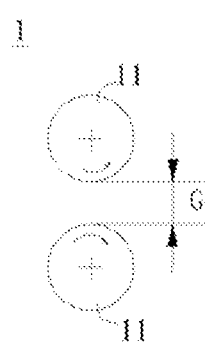
FIG. 2 is a schematic diagram of a rolling mechanism of the device for supplementing electrode sheet with the lithium according to the application.

FIG. 1 is a schematic diagram of a first embodiment of a device for supplementing electrode sheet with lithium according to the application. FIG. 2 is a schematic diagram of a rolling mechanism of the device for supplementing electrode sheet with lithium according to the application.

As shown in the FIG. 1, the device for supplementing electrode sheet with lithium comprises a rolling mechanism 1, an electrode sheet providing mechanism 2, and a lithium film providing mechanism 3. According to the actual situation, the device for supplementing electrode sheet with lithium may further comprise a transfer film collection mechanism 5. According to the actual situation, the device for supplementing electrode sheet with lithium may further comprise a lithium supplemented electrode sheet collection mechanism 6.

An electrode sheet P0 comprises a current collector P01 and an active substance layer P02 discontinuously arranged on the surface of the current collector P01. In FIG. 1, the position between the discontinuous active substance layer P02 is a blank current collector region R, the part, without the active substance layer P02, on the surface of the current collector P01. In FIG. 1, the active substance layers P02 on both surfaces of the current collector P01 are symmetrically distributed with respect to the current collector P01. Of course, the active substance layer P02 may be arranged on only one surface of the current collector P01. As shown in FIG. 1, an electrode sheet providing mechanism 2 may be a roll, such that the electrode sheet providing mechanism 2 unwinds the electrode sheet P0 in the form of a roll.

A rolling mechanism 1 comprises two compression rollers 11. A gap G is reserved between the two compression rollers 11.

The electrode sheet providing mechanism 2 is located upstream from the two compression rollers 11. The electrode sheet providing mechanism 2 is used for providing the electrode sheet P0 between the two compression rollers 11.

The lithium film providing mechanism 3 is located upstream from the two compression rollers 11. The lithium film providing mechanism 3 is used for providing a lithium film C. The lithium film C comprises a transfer film T and a lithium foil L1. The lithium foil L1 adheres to the transfer film T and faces the active substance layer P02 of the electrode sheet P0. In FIG. 1, the lithium foil L1 continuously adheres to the transfer film T.

In FIG. 1, a lithium film providing mechanism 3 comprises a pressing mechanism 31. According to the actual situation, the lithium film providing mechanism 3 may further comprise an auxiliary film providing mechanism 32. According to the actual situation, the lithium film providing mechanism 3 may further comprise an auxiliary film collection mechanism 33.

The pressing mechanism 31 is used for making the lithium foil L1 to adhere to the transfer film T. In FIG. 1, the pressing mechanism 31 is used for making the lithium foil L1 continuously adhere to the transfer film T. In FIG. 1, the pressing mechanism 31 comprises a transfer film providing mechanism 311, a lithium ribbon providing mechanism 312, and two rollers 313. The transfer film providing mechanism 311 is used for providing the transfer film T between the two rollers 313. As shown in FIG. 1, the transfer film providing mechanism 311 is a roll, such that the transfer film providing mechanism 311 is used for unwinding the transfer film T in the form of a roll. The lithium ribbon providing mechanism 312 is used for providing a lithium ribbon L0 between the two rollers 313. As shown in FIG. 1, the lithium ribbon providing mechanism 312 is a roll, such that the lithium ribbon providing mechanism 312 is used for unwinding the lithium ribbon L0 in the form of a roll. The two rollers 313 are used for pressing the lithium ribbon L0 and the transfer film T, thereby pressing the lithium ribbon L0 into the lithium foil L1 and making the lithium foil L1 adhere to the transfer film T, so as to form a lithium film C. In other words, the adhesive force between the lithium foil L1 and the transfer film T is greater than that between the lithium foil L1 and the roller 313 (located on the side of the lithium foil L1, opposite the transfer film T). In FIG. 1, the two rollers 313 press the lithium ribbon L0 into the lithium foil L1 and make the lithium foil L1 continuously adhere to the transfer film T.

An auxiliary film providing mechanism 32 is located upstream from the pressing mechanism 31. The auxiliary film providing mechanism 32 is used for providing an auxiliary film A for the pressing mechanism 31 (particularly between the two rollers 313). In other words, the adhesive force between the lithium foil L1 and the transfer film T is greater than that between the lithium foil L1 and the auxiliary film A. Thus, the two rollers 313 may press the lithium ribbon L0, the transfer film T and the auxiliary film A entering between the two rollers 313 to press the lithium ribbon L0 into the lithium foil L1 and make the lithium foil L1 continuously adhere to the transfer film T, so as to form the lithium film C. As shown in FIG. 1, the auxiliary film providing mechanism 32 is a roll, such that the auxiliary film providing mechanism 32 is used for unwinding the auxiliary film A in the form of a roll.

An auxiliary film collection mechanism 33 is located downstream from the pressing mechanism 31. The auxiliary film collection mechanism 33 is used for collecting the auxiliary film A passing through the pressing mechanism 31 (particularly between the two rollers 313) so as to recycle the auxiliary film A and provide a traction force for the auxiliary film A. It is to be noted that the auxiliary film providing mechanism 32 and the auxiliary film collection mechanism 33 can be omitted. In this case, as long as the adhesive force between the lithium foil L1 and the transfer film T is greater than that between the lithium foil L1 and the roller 313 (located on the side of the lithium foil L1, opposite the transfer film T), the lithium foil L1 can continuously adhere to the transfer film T to form the lithium film C. As shown in FIG. 1, the auxiliary film collection mechanism 33 is a roll, such that the auxiliary film collection mechanism 33 is used for collecting the auxiliary film A. The lithium film providing mechanism 3 is not limited to an example shown in FIG. 1, and the lithium film C provided by the lithium film providing mechanism 3 may use a finished lithium film C, that is, an off-line shaped lithium film C product.

A strip providing mechanism 4 is used for providing a strip S between the transfer film T of the lithium film C and the compression roller 11 on a side corresponding to the transfer film T. The strip S comprises a substrate S1 and an adhesion layer S2 discontinuously arranged on the substrate S1, and the adhesion layer S2 can correspond to the active substance layer P02 of the electrode sheet P0. The substrate S1 is located between the adhesion layer S2 and the transfer film T of the lithium film C, and the adhesion layer S2 is located between one of the compression rollers 11 and the substrate S1. The material of the substrate S1 may be selected from any suitable and known material as long as it exists. Likewise, the material of the adhesion layer S2 may be selected from any suitable and known material as long as it exists. The adhesion layer S2 may be arranged in a coating manner.

The strip providing mechanism 4 comprises a strip release mechanism 41 and a strip collection mechanism 42 that are arranged at the upstream and the downstream of the two compression rollers 11 respectively. The strip release mechanism 41 is used for releasing the strip S to the two compression rollers 11. As shown in FIG. 1, the strip release mechanism 41 is a roll, such that the strip release mechanism 41 is used for unwinding the strip S in the form of a roll. The strip collection mechanism 42 is used for collecting the strip S passing through the two compression rollers while providing a traction for the strip S. As shown in FIG. 1, the strip collection mechanism 42 is a roll, such that the strip collection mechanism 42 is used for winding the strip S.

The gap size G between the two compression rollers 11 is smaller than the sum of the thicknesses of the adhesion layer S2, the substrate S1, the lithium film C, the current collector P01 and the active substance layer P02 and is greater than the sum of the thicknesses of the substrate S1, the lithium film C and the current collector P01. The rolling mechanism 1 rolls the strip S, the lithium film C and the electrode sheet P0 in a state in which the adhesion layer S2 corresponds to the active substance layer P02 of the electrode sheet P0, and the lithium foil L1 in the lithium film C discontinuously adheres to the active substance layer P02 while the remaining part, except for the part discontinuously adhering to the active substance layer P02, of the lithium foil L1 is discontinuously retained on the transfer film T.

A transfer film collection mechanism 5 is located downstream from the two compression rollers 11. The transfer film collection mechanism 5 is used for collecting the transfer film T passing through the two compression rollers 11 while providing a traction force for the lithium film C. As shown in FIG. 1, the transfer film collection mechanism 5 is a roll, such that the transfer film collection mechanism 5 winds the transfer film T.

A lithium supplemented electrode sheet collection mechanism 6 is located downstream from the two compression rollers 11. The lithium supplemented electrode sheet collection mechanism 6 is used for collecting the electrode sheet P0 (that is a lithium supplemented electrode sheet P1) with the lithium foil L1 adhering to the active substance layer P02 while providing a traction force for the electrode sheet P0. As shown in FIG. 1, the lithium supplemented electrode sheet collection mechanism 6 is a roll, such that the lithium supplemented electrode sheet collection mechanism 6 is used for winding the lithium supplemented electrode sheet P1.

The lithium film providing mechanism 3, the strip providing mechanism 4 and the transfer film collection mechanism 5 are correspondingly arranged into one or two sets on the basis that the active substance layer P02 is arranged on one or two surfaces of the current collector P01.

In the first embodiment shown in FIG. 1, the strip S provided by the strip providing mechanism 4 separates the transfer film T from the corresponding compression roller 11, thereby widening the gap between the two compression rollers 11 of the rolling mechanism 1, such that the pressure of covering the lithium film C during supplementing the electrode sheet with the lithium P0 is reduced and the damage to the lithium supplemented electrode sheet P1 and the transfer film T of the lithium film after lithium supplement due to a large covering force is reduced, ensuring the quality of the lithium supplemented electrode sheet P1. In the first embodiment shown in FIG. 1, the strip collection mechanism 42, the transfer film collection mechanism 5, and the lithium supplemented electrode sheet collection mechanism 6 provide three traction forces for a single side of the electrode sheet P0. When the active substance layer P02 of the lithium supplemented electrode sheet P1 leaves the gap G while the blank current collector region R of the electrode sheet P0 enters the gap G, the lithium foil L1 attached to the active substance layer P02 of the lithium supplemented electrode sheet P1 and the remaining lithium foil L1 on the transfer film T are disconnected by the three traction forces and the adhesive force from the transfer film T to the lithium foil L1, and with the discontinuous active substance layer P02 continuously entering the gap G and then exiting from the gap G, the remaining part, except for the part discontinuously adhering to the active substance layer P02, of the lithium foil L1 is discontinuously retained on the transfer film T. Compared with two traction forces provided on the single side of the electrode sheet in the background art, discontinuous disconnection of the lithium foil L1 on the transfer film T can be smoother and more accurate.

Figure 3:
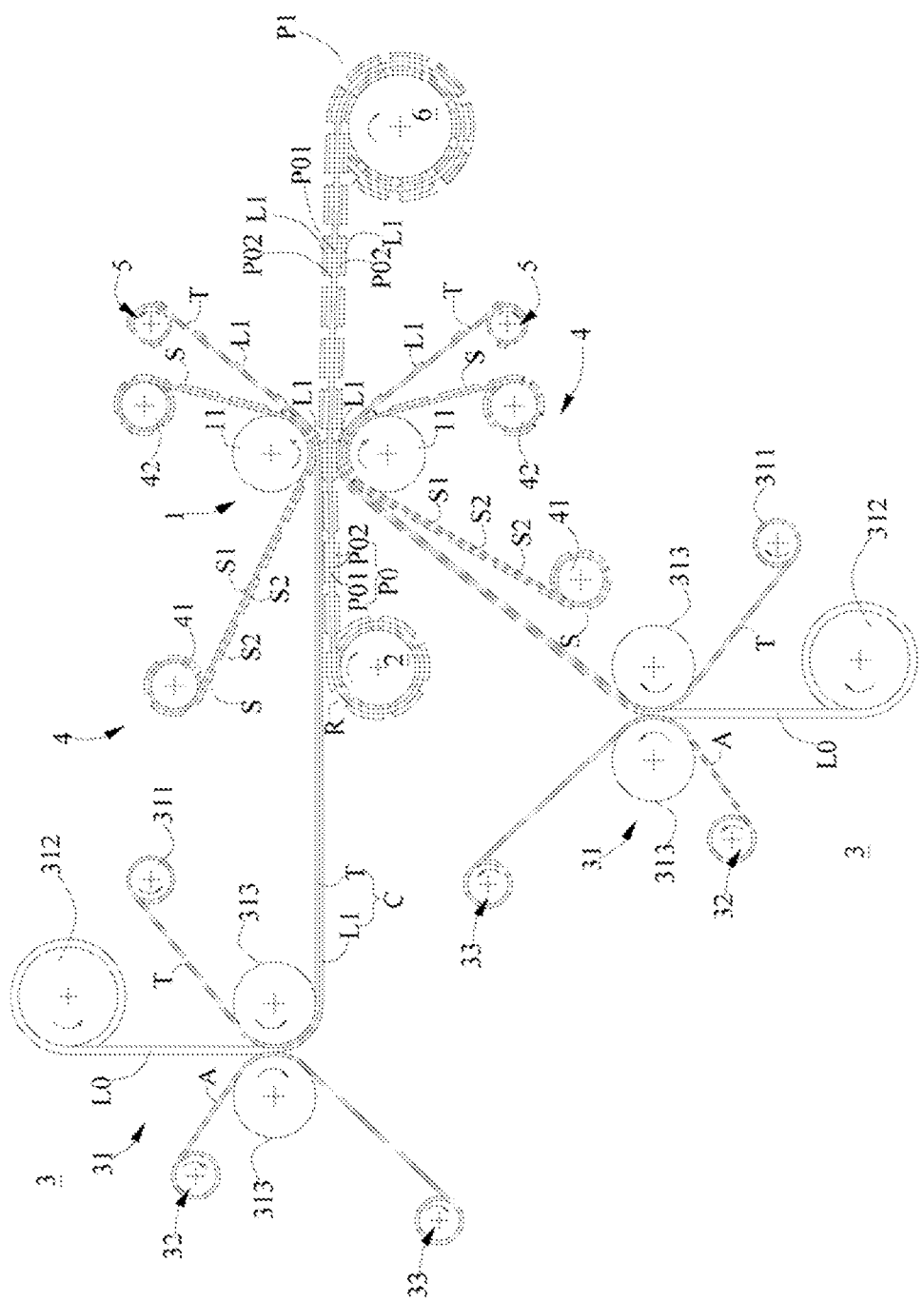
FIG. 3 is a schematic diagram of a second embodiment of the device for supplementing electrode sheet with lithium according to the application.

FIG. 3 is a schematic diagram of a second embodiment of the device for supplementing electrode sheet with lithium according to the application. It is to be noted that the components having the same structure as components in the first embodiment is indicated by the same reference number and their description is omitted. Further, the description of the same actions and functions as the first embodiment will be omitted.

Different from the first embodiment of the device for supplementing electrode sheet with lithium in FIG. 1, in the second embodiment, the substrate S1 is located between the adhesion layer S2 and one of the compression rollers 11, and the adhesion layer S2 is located between the transfer film T of the lithium film C and the substrate S1. In other words, the strip S in the second embodiment is reversed relative to the strip S in the first embodiment.

In the second embodiment shown in FIG. 3, due to the arrangement of the strip S, a gap G between the two compression rollers 11 of the rolling mechanism 1 is added, thereby reducing the pressure of covering the lithium film C during supplementing the electrode sheet P0 with lithium, reducing the damage to the lithium supplemented electrode sheet P1 and the transfer film T of the lithium film C after lithium supplement caused by the large covering force, and ensuring the quality of the lithium supplemented electrode sheet P1. Further, due to contact between the discontinuously arranged adhesion layer S2 and the transfer film T, damage to the transfer film T due to frictions with the strip S is less than that in the first embodiment.

In conclusion, compared with background art, due to the arrangement of the strip providing mechanism 4, the strip S provided by the strip providing mechanism 4 can reduce the pressure of covering the lithium film C in the lithium supplement process of the electrode sheet P0, thereby reducing the damage to the lithium supplemented electrode sheet P1 and the transfer film T of the lithium film C after lithium supplement.

The method for supplementing electrode sheet with lithium in the embodiments of the application will be described below and for the parts not described in detail, reference may be made to the above-mentioned embodiments.

In the method for supplementing the electrode sheet with the lithium, the electrode sheet comprises a current collector and an active substance layer discontinuously arranged on the surface of the current collector. The method for supplementing electrode sheet with lithium includes: providing the electrode sheet, a lithium film and a strip in a way that the lithium film is located between the strip and the electrode sheet, wherein the lithium film comprises a transfer film and a lithium foil, wherein the strip comprises a substrate and an adhesion layer discontinuously arranged on the substrate, and the adhesion layer can correspond to the active substance layer of the electrode sheet; and rolling the strip, the lithium film and the electrode sheet, such that the lithium foil in the lithium film adheres to the active substance layer.

In some embodiments, after rolling the strip, the lithium film and the electrode sheet, the method for supplementing electrode sheet with lithium further includes: collecting the transfer film.

In some embodiments, prior to providing the lithium film, the method for supplementing electrode sheet with lithium further includes: making the lithium foil adhere to the transfer film.

In some embodiments, making the lithium foil adhere to the transfer film includes: providing a lithium ribbon, the transfer film and an auxiliary film; pressing the lithium ribbon, the transfer film and the auxiliary film so as to press the lithium ribbon into the lithium foil and make the lithium foil continuously adhere to the transfer film, so as to form the lithium film.

In some embodiments, after pressing the lithium ribbon, the transfer film and the auxiliary film, making the lithium foil adhere to the transfer film further includes collecting the auxiliary film.

In some embodiments, after rolling the strip, the lithium film and the electrode sheet, the method for supplementing electrode sheet with lithium further includes collecting the strip.

In some embodiments, the substrate and/or the adhesion layer have/has elasticity.

In some embodiments, after rolling the strip, the lithium film and the electrode sheet, the method for supplementing electrode sheet with lithium further includes collecting the electrode sheet with the lithium film adhering to the active substance layer.

In some embodiments, the lithium film, the transfer film and the strip are correspondingly arranged into one or two sets on the basis that the active substance layer is arranged on one or two surfaces of the current collector.

In conclusion, compared with background art, by providing the strip, the strip providing mechanism can reduce the pressure of covering the lithium film in the lithium supplement process of the electrode sheet, thereby reducing the damage to the lithium supplemented electrode sheet and the transfer film of the lithium film after lithium supplement. The foregoing detailed description describes the plurality of exemplary embodiments, but the document is not intended to be limited to explicitly disclosed combinations. Thus, unless otherwise indicated, various features disclosed herein may be combined together to form a plurality of additional combinations not shown for the purpose of brevity.

What is claimed is:

1. A device for supplementing an electrode sheet with lithium, the electrode sheet comprising a current collector and an active substance layer discontinuously arranged on the surface of the current collector, and the device for supplementing an electrode sheet with lithium comprising a rolling mechanism, an electrode sheet providing mechanism, and a lithium film providing mechanism;
    the rolling mechanism comprising two compression rollers;
    the electrode sheet providing mechanism located upstream from the two compression rollers, and the electrode sheet providing mechanism configured to provide the electrode sheet between the two compression rollers; and
    the lithium film providing mechanism located upstream from the two compression rollers, the lithium film providing mechanism used for providing a lithium film, and the lithium film comprising a transfer film and a lithium foil; wherein
    the device for supplementing an electrode sheet with lithium further comprises a strip providing mechanism,
    the strip providing mechanism configured to provide a strip between the transfer film and the compression roller on the side corresponding to the same, the strip comprising a substrate and an adhesion layer discontinuously arranged on the substrate, the adhesion layer corresponding to the active substance layer of the electrode sheet; and
    the rolling mechanism is used for rolling the strip, the lithium film and the electrode sheet, to make the lithium foil in the lithium film adhere to the active substance layer.

2. The device for supplementing an electrode sheet with lithium according to claim 1, wherein
    the device for supplementing an electrode sheet with lithium further comprises a transfer film collection mechanism,
    the transfer film collection mechanism is located downstream from the two compression rollers, and the transfer film collection mechanism is configured to collect the transfer film passing through the two compression rollers.

3. The device for supplementing an electrode sheet with lithium according to claim 1, wherein
    the lithium film providing mechanism comprises a pressing mechanism; the pressing mechanism is configured to make the lithium foil adhere to the transfer film.

4. The device for supplementing an electrode sheet with lithium according to claim 3, wherein the lithium film providing mechanism further comprises an auxiliary film providing mechanism; the auxiliary film providing mechanism is located upstream from the pressing mechanism, and the auxiliary film providing mechanism is used for providing an auxiliary film to the pressing mechanism.

5. The device for supplementing an electrode sheet with lithium according to claim 4, wherein the lithium film providing mechanism further comprises an auxiliary film collection mechanism; the auxiliary film collection mechanism is located at the downstream of the pressing mechanism, and the auxiliary film collection mechanism is configured to collect the auxiliary film passing through the pressing mechanism.

6. The device for supplementing an electrode sheet with lithium according to claim 3, wherein the pressing mechanism comprises a transfer film providing mechanism, a lithium ribbon providing mechanism and two rollers;
    the transfer film providing mechanism is configured to provide the transfer film between the two rollers;
    the lithium ribbon providing mechanism is configured to provide a lithium ribbon for a space between the two rollers;
    and the two rollers is configured to press the lithium ribbon and the transfer film, so as to press the lithium ribbon into the lithium foil, and make the lithium foil adhere to the transfer film to form the lithium film.

7. The device for supplementing an electrode sheet with lithium according to claim 1, wherein
    the strip providing mechanism comprises a strip release mechanism and a strip collection mechanism that are arranged upstream and downstream from the two compression rollers respectively; the strip release mechanism is configured to release the strip to the two compression rollers, and the strip collection mechanism is configured to collect the strip passing through the two compression rollers.

8. The device for supplementing an electrode sheet with the lithium according to claim 1, wherein the substrate and/or the adhesion layer have/has elasticity.

9. The device for supplementing an electrode sheet with lithium according to claim 1, wherein
    the device for supplementing an electrode sheet with lithium further comprises a lithium supplemented electrode sheet collection mechanism,
    the lithium supplemented electrode sheet collection mechanism is located downstream from the two compression rollers, and the lithium supplemented electrode sheet collection mechanism is configured to collect the electrode sheet with the lithium foil adhering to the active substance layer.

10. The device for supplementing an electrode sheet with lithium according to claim 2, wherein the lithium film providing mechanism, the transfer film collection mechanism and the strip providing mechanism are correspondingly configured to be arranged into one or two sets on the basis that the active substance layer is configured to be arranged on one or two surfaces of the current collector.

11. A method for supplementing an electrode sheet with lithium, the electrode sheet comprising a current collector and an active substance layer discontinuously arranged on the surface of the current collector, wherein the method for supplementing an electrode sheet with lithium comprises:
   providing the electrode sheet, a lithium film and a strip in a way that the lithium film is located between the strip and the electrode sheet, wherein the lithium film comprises a transfer film and a lithium foil; the strip comprises a substrate and an adhesion layer discontinuously arranged on the substrate, and the adhesion layer can correspond to the active substance layer of the electrode sheet; and
   rolling the strip, the lithium film and the electrode sheet, thereby enabling the lithium foil in the lithium film to adhere to the active substance layer.

12. The method for supplementing an electrode sheet with lithium according to claim 11, wherein prior to providing the lithium film, the method for supplementing an electrode sheet with lithium further comprises making the lithium foil adhere to the transfer film.

13. The method for supplementing an electrode sheet with lithium according to claim 12, wherein making the lithium foil adhere to the transfer film comprises:
   providing a lithium ribbon, the transfer film and an auxiliary film; and
   pressing the lithium ribbon, the transfer film and the auxiliary film so as to press the lithium ribbon into the lithium foil and continuously make the lithium foil adhere to the transfer film to form the lithium film.

14. The method for supplementing an electrode sheet with lithium according to claim 11, wherein the lithium film, the transfer film and the strip are correspondingly arranged into one or two sets on the basis that the active substance layer is arranged on one or two surfaces of the current collector.

* * * * *